United States Patent [19]
Frey et al.

[11] Patent Number: 5,996,980
[45] Date of Patent: Dec. 7, 1999

[54] ROLLING SLEEVE-TYPE GAS SPRING WITH DUST PROTECTION

[75] Inventors: Joachim Frey, Schorndorf; Peter Gönnheimer, Weinstadt, both of Germany

[73] Assignee: DaimlerChrysler AG, Stuttgart, Germany

[21] Appl. No.: 09/019,080

[22] Filed: Feb. 5, 1998

[30] Foreign Application Priority Data

Feb. 6, 1997 [DE] Germany .............................. 197 04 434

[51] Int. Cl.⁶ ....................................................... F16F 9/04
[52] U.S. Cl. ....................................................... 267/64.27
[58] Field of Search .............................. 267/64.19, 64.21, 267/64.23, 64.27

[56] References Cited

U.S. PATENT DOCUMENTS

| | | | |
|---|---|---|---|
| 4,493,481 | 1/1985 | Merkle | 267/64.27 |
| 4,722,516 | 2/1988 | Gregg | 267/64.27 |
| 5,005,808 | 4/1991 | Warmuth, II et al. | 267/64.27 |

FOREIGN PATENT DOCUMENTS

| | | | |
|---|---|---|---|
| 1003608 | 2/1957 | Germany | 267/64.27 |
| GM 18 16 597 | 7/1960 | Germany . | |

*Primary Examiner*—Robert J. Oberleitner
*Assistant Examiner*—Devon Kramer
*Attorney, Agent, or Firm*—Klaus J. Bach

[57] ABSTRACT

In a rolling sleeve-type gas spring, particularly for a vehicle support structure, wherein the gas spring includes a cylinder, a piston received in the cylinder with an annular space formed therebetween and a rolling sleeve mounted to the piston and the cylinder and having a meniscus portion extending into the annular space from within the cylinder for containing gas under pressure in the cylinder, a second rolling sleeve is connected to the piston and the cylinder and extends into the annular space from without for preventing soiling of the surfaces of the piston and the cylinder defining the annular space.

5 Claims, 1 Drawing Sheet

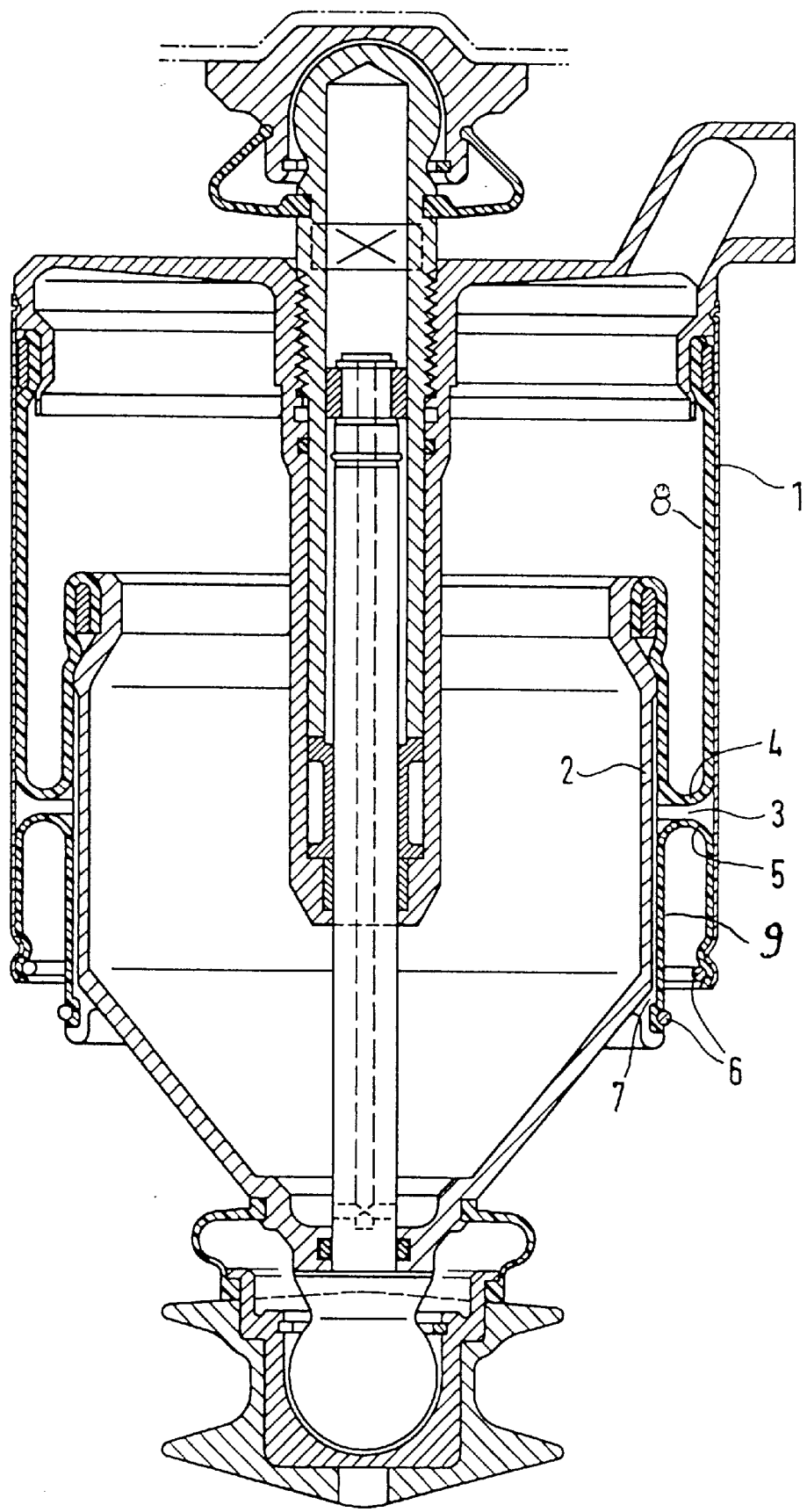

ROLLING SLEEVE-TYPE GAS SPRING WITH DUST PROTECTION

BACKGROUND OF THE INVENTION

The invention relates to a rolling sleeve-type gas spring with dust protection including a U-shaped sleeve disposed in a cylinder mounted on one of two spring components and rolling over a piston extending from the other component into the cylinder. Such gas springs are particularly suited for the wheel support arrangements of vehicles which however are exposed to dust and road dirt.

Such rolling sleeve-type springs are known, for example, from DE GM 1 816 597 and U.S. Pat. No. 4,722,516. In the first mentioned document, the dust protection comprises a bellows, which is mounted on the outside of the cylinder. Such a bellows, however, requires a relatively large amount of space around the air spring. In U.S. Pat. No. 4,722,516, the dust protection comprises an annular dirt shield disposed at the open end of the cylinder and slidingly engaging the piston. Such an arrangement, however, generates undesirable friction upon relative movement between the piston and the cylinder.

It is the object of the present invention to provide a rolling sleeve-type gas spring with dust protection which is space saving and subject to only little friction. In addition, venting provisions for venting the space between the gas pressurized rolling sleeve and the dust protection should be simple.

SUMMARY OF THE INVENTION

In a rolling sleeve-type gas spring, particularly for a vehicle support structure, wherein the gas spring includes a cylinder, a piston received in the cylinder with an annular space formed therebetween and a rolling sleeve mounted to the piston and the cylinder and having a meniscus portion extending into the annular space from within the cylinder for containing gas under pressure in the cylinder, a second rolling sleeve is connected to the piston and the cylinder and extends into the annular space from without for preventing soiling of the surfaces of the piston and the cylinder defining the annular space.

The rolling sleeve provided for dust protection is guided in the same annular space between the piston and the cylinder as the spring sleeve and permits relative movement of the piston and cylinder with very little friction. In addition, the space between the two rolling sleeves moves axially during relative movement between the cylinder and the piston, but does not change its volume or changes its vblume only very slightly. For venting, the piston may have an axial groove formed in its outer wall to provide communication with the ambient air.

The rolling type dust protection sleeve is mounted onto the piston and the cylinder preferably by clamping rings engaging the sleeve ends with grooves formed in the piston and cylinder.

An embodiment of the invention is shown in the accompanying drawing.

BRIEF DESCRIPTION OF THE DRAWINGS

The sole FIGURE is an axial cross-sectional view of the rolling sleeve-type vehicle spring according to the invention.

DESCRIPTION OF A PREFERRED EMBODIMENT

A rolling sleeve-type spring as shown in the FIGURE, comprises a cylinder 1 receiving a piston 2 having an outer surface spaced from the inner surface of the cylinder 1 so as to form therebetween an annular space 3. A flexible membrane in the form of a rolling sleeve 8 has its opposite ends mounted on the cylinder 1 and the piston 2 respectively, with a U-shaped meniscus structure disposed in the annular space 3 for closing the pressure space within the cylinder 1 and the hollow piston 2. The spring includes a dust protection structure consisting of a second rolling sleeve 9 disposed in the annular space 3 between the piston 2 and the cylinder 1 and having its ends mounted to the ends of the outer ends of the piston and cylinder. The second rolling sleeve 9 has its meniscus structure 5 arranged on the opposite direction of that of the first rolling sleeve 8; that is, the U-shaped rolling ends 4 and 5 of the two sleeves are disposed in the annular space 3 opposite each other.

The second rolling sleeve 9 is mounted, by means of radial clamping rings 6 in annular grooves formed in the piston 2 and the cylinder 1 for that purpose. For the venting of the area of the annular space 3 between the two rolling sleeve meniscus ends 4 and 5, the outer surface of the piston 2 on which the rolling sleeve 9 is disposed includes a longitudinal groove 7 extending parallel to the axis of the piston 2 and providing for communication of the space between the rolling sleeve meniscus ends 4 and 5 and the ambient air.

The use of a second rolling sleeve 9 as a dust protection for the annular space 3 between the piston 2 and the cylinder 1 provides for a highly space-saving arrangement. With a good rolling behavior of the rolling sleeves 8 and 9 on the rolling sleeve-type spring components (cylinder 1 and piston 2), there are practically no friction losses and excellent dust and dirt protection is provided.

What is claimed is:

1. A rolling sleeve-type gas spring for resiliently supporting one structure on another, said gas spring including a cylinder, a piston having an inner end received in said cylinder and having a diameter smaller than said cylinder such that an annular space is formed between said piston and said cylinder, a first rolling sleeve having one end mounted to said inner end of said piston and its other end mounted to said cylinder and an intermediate U-shaped meniscus portion extending into said annular space from within said cylinder and rolling along the inner surface of said cylinder and the outer surface of said piston upon relative axial movement of said piston and said cylinder while containing gas under pressure within said cylinder, and a second rolling sleeve having opposite ends, one mounted to the outer end of said cylinder and the other to said piston and having an intermediate U-shaped meniscus portion extending into said annular space from without said cylinder, said U-shaped meniscus portions of said rolling sleeves being disposed in said annular space opposite each other such that U-shaped portions point towards each other so as to seal said annular space for preventing soiling of the inner and outer surfaces of said cylinder and said piston along which said rolling sleeves roll during relative axial movement of said piston and said cylinder.

2. A rolling sleeve-type gas spring according to claim 1, wherein a gap is formed in said annular space between the meniscus portions of said first and second rolling sleeves and vent means are provided establishing communication between said gap and the ambient air.

3. A rolling sleeve-type gas spring according to claim 2, wherein said vent means comprises a groove formed on one of the piston and cylinder surfaces adjacent said second rolling sleeve.

4. A rolling sleeve-type gas spring according to claim 1, wherein said outer piston surfaces supporting said first and said second rolling sleeves have the same diameter and said inner cylinder surfaces supporting said first and said second rolling sleeves have the same diameter.

5. A rolling sleeve-type gas spring according to claim 1, wherein said second rolling sleeve is mounted on said piston and said cylinder, respectively by means of clamping rings sealed in annular grooves formed in said piston and said cylinder, respectively.

* * * * *